Patented Apr. 24, 1945

2,374,181

UNITED STATES PATENT OFFICE 2,374,181

MORPHOLINE COMPOUNDS

Joseph B. Dickey and James G. McNally, Rochester, N. Y., assignors to Eastman Kodak Company, Rochester, N. Y., a corporation of New Jersey No Drawing. Application November 16, 1940, Serial No. 365,989

7 Claims. (Cl. 260—244)

This invention relates to certain new morpholine compounds and particularly new morpholine compounds which contain a benzo- or naphtho-ring and certain other groupings in addition to the morpholine nucleus, and which are particularly useful as dye intermediates.

Morpholine compounds are known industrially, and as indicated, are useful for dye intermediates. The use of certain morpholine compounds in the production of dyes is described in our copending application, Serial No. 309,688 filed December 16, 1939, now Patent No. 2,251,947, dated August 12, 1941. We have now found additional new morpholine compounds and methods of manufacture, which compounds extend the field of usefulness of morpholine compounds and represent a substantial improvement over many of the morpholine compounds heretofore available.

This invention has for one object to provide new morpholine compounds and in particular morpholine compounds containing a benzo- or naphtho-group in addition to, or in conjunction with, the morpholine nucleus and certain substituted alkyl grouping. Still another object is to provide new morpholine compounds which are particularly useful as dye intermediates in that they readily couple in azo dye manufacture and produce improved shades of color and other advantages. Still another object is to provide procedure for producing the aforementioned new compounds. Other objects will appear hereinafter.

We have found that several new morpholine compounds which are particularly useful as dye intermediates, can be prepared by reacting various benzo- and naphthomorpholine with reagents such as alkylene oxides and chlorohydrins, halogenated acids, acid amides, ethers, ketones, esters and the like, unsaturated aliphatic acid nitriles and the like. In general the structure of the new compounds may be represented by formulas as follows:

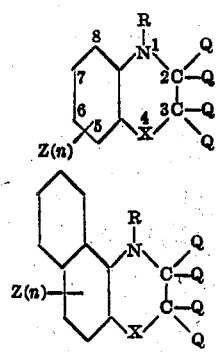

where X is oxygen or sulfur; R is a substituted alkyl group; $n$ is 0, 1, etc.; Z is a monovalent substituent. However, it should be noted in this respect that the monovalent substituent will probably comprise alkyl, alkoxy, halogen, and $NaSO_3$ and the like, usually in some position other than the sixth position. For example, a simple amino group in the sixth position yields a product which will not couple in azo dye manufacture. Q is a radical of the group selected from hydrogen alkyl, cycloalkyl, aryl or heterocyclic.

The morpholine compounds which are used as starting materials in the production of our novel morpholine derivatives may be obtained from any convenient source or produced by known processes. For example, methods of producing certain morpholine compounds are described in Berichte. Or the starting morpholine compounds may be obtained by the methods described, or referred to, in our copending application 309,688 (see above) or the copending companion application in the name of Strain and Dickey, Serial No. 365,988, filed November 16, 1940, entitled Process for producing morpholine compounds.

A more complete understanding of our invention will be had from the consideration of the following examples which show the production of various of our new morpholine compounds by procedure illustrating one type of method for their preparation. While the following examples illustrate the preferred embodiments of our invention, they are not to be considered an undue limitation upon our invention.

EXAMPLE 1

*N-β-hydroxyethyl-3-methylbenzomorpholine*

One gram mole of 3-methyl benzomorpholine is heated in an autoclave at 160-200° with 1.25 gram moles of ethylene oxide for 6-8 hours. When cool the reaction products are removed and distilled under reduced pressure. There is obtained an excellent yield of N-β-hydroxyethyl-3-methylbenzomorpholine boiling at 145-148°/3 mm. Similarly, we have prepared N-β-hydroxyethylbenzomorpholine, N-β-hydroxyethylbenzothiomorpholine, N-β-hydroxyethyl-3,5-dimethylbenzomorpholine, N-β-hydroxyethyl-7-methylmorpholine, N-β-hydroxyethyl-α-naphthomorpholine, etc.

EXAMPLE 2

*2,3,5-trimethyl-N-2,3-dihydroxypropylbenzothiomorpholine*

One gram mole 2,3,5-trimethylbenzothiomorpholine is heated in an autoclave with glycidol at 75-150° for 4-12 hours. The product on distillation gives a good yield of the N-2,3-dihydroxypropyl compound boiling at 198-201°/3 mm. Similarly, the following have been prepared: 2-p-sulfophenyl-N-2,3-dihydroxypropylbenzothiomorpholine, 2-sulfobenzyl-N-2,3-dihydroxypropyl-α-naphthoquinoline-7-sulfonic acid, 2,3-diethyl-N-2,3-dihydroxypropylbenzomorpholine sulfonic acid-7, etc.

EXAMPLE 3

Two gram moles benzomorpholine are heated with one gram mole of 1,3-butylene oxide at 160–200° for 4–10 hours. The reaction product has the formula:

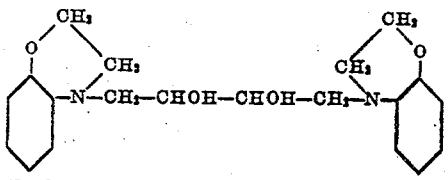

Similarly, there have been prepared:

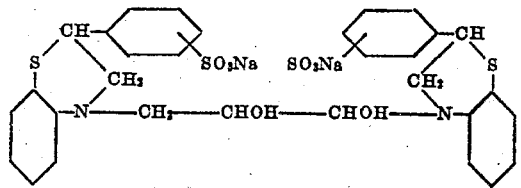

EXAMPLE 4

*N-2,3-dihydroxypropyl-2-methylbenzomorpholine*

One mole 3-methylbenzomorpholine is heated to 140° in a flask fitted with a mechanical stirrer. To this are added 1.25 moles sodium bicarbonate and then 1.25 moles glycerolchlorohydrin are added slowly. After the chlorohydrin is added, heating and stirring are continued until no more carbon dioxide is evolved. The product is then separated from the salt by means of alcohol and distilled under reduced pressure. There is obtained a good yield of N-2,3-dihydroxypropyl-2-methylmorpholine melting at 82–84° from benzene.

Similarly, the following have been prepared: N-2,3-dihydroxypropyl-2,7-dimethylbenzomorpholine, N-2,3-dihydroxypropyl-2,5-dimethylbenzomorpholine, N-2,3-dihydroxypropyl-3-sulfobenzyl-α-naphthomorpholine, N-β-hydroxyethylbenzomorpholine, N-β-hydroxypropyl-2-ω-hydroxymethyl-5-methoxybenzomorpholine, N-γ-hydroxypropyl-2-methoxymethylbenzomorpholine, etc.

EXAMPLE 5

*α-Naphthothiomorpholine-N-acetamide*

One mole α-naphthothiomorpholine is heated to 70–85° in ethanol with 1 mole sodium bicarbonate and 1 mole chloroacetamide. When no more carbon dioxide is evolved, the salt is filtered out and the product allowed to crystallize. Similarly, the following have been prepared: 2-methylbenzomorpholine acetamide, 2-methyl-5-methoxybenzomorpholine-N-β-propionamide, etc.

EXAMPLE 6

*N-carboxymethyl-5-methyl-7-methoxybenzomorpholine sodium salt*

One mole 5-methyl-7-methoxybenzomorpholine is heated in water with one mole sodium chloroacetate at 50°. The excess morpholine is removed by steam and the compound is recovered by evaporation. Similarly, the following have been prepared: N-β-carboxyethyl-2-methyl-5-carboxybenzomorpholine, N-CH₂-CH₂-CH₂-COOH-7-sulfobenzomorpholine, etc.

EXAMPLE 7

*3-ethyl-7-methylbenzomorpholine-N-β-propionitrile*

One mole 3-ethyl-7-methylbenzomorpholine is heated in an autoclave with one mole acrylonitrile at temperatures ranging between 50–250°. After 4–12 hours the reaction product is distilled. There is obtained 3-ethyl-7-methyl-benzo-N-β-propionitrile boiling at 195–200°/3 mm. Similarly, there have been prepared: 7-hydroxy-2-methylbenzothiomorpholine-β-methyl-β-propionitrile, etc. Under suitable conditions these nitriles can be hydrolyzed to the acid, amide or ester and with a catalyst such as "Raney" nickel reduced to compounds having the formula:

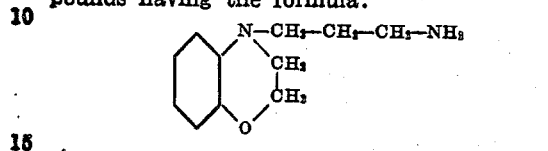

etc.

From the foregoing it can be seen that we have provided methods for producing our new compounds, which methods are relatively uncomplicated and convenient and give excellent yields. Our methods may generally be described as reacting under conditions of heating in an autoclave, the benzo- or naphthomorpholine starting materials with a reagent which reacts at the nitrogen atom of the morpholine nucleus to cause the addition of the desired substituent at this point. As described, alkylene oxides, chlorohydrins or other halogen derivatives as halogenated esters or ethers, or nitriles, may be used as the reagent. It will be observed, however, that we generally employ a halogenated derivative of a radical having a rather long chain. While we do not wish to be bound by any theory respecting our invention, it may be that to some extent the addition of these long-chain compounds with solubilizing groups contribute to the quality of our new compounds, rendering them useful as dye intermediate in azo dye manufacture.

As indicated, our new compounds are particularly useful in dye manufacture, producing for example, in some instances, bluer dyes than heretofore obtainable. In addition they have the property of easily coupling in azo dye manufacture. Also, our new compounds are useful in other fields. For example, certain of our compounds may have value under some conditions as antioxidants, reducing agents, and the like.

From the foregoing it is therefore apparent that our invention is susceptible to some modification; hence, we do not wish to be restricted excepting insofar as is necessitated by the prior art and the spirit of the appended claims.

We claim:

1. The compounds which are represented by a member selected from the group consisting of the following formulas:

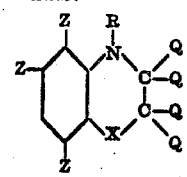

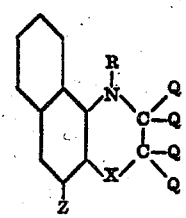

wherein R represents a hydroxyalkyl group, Q represents a member selected from the group consisting of hydrogen and alkyl groups at least one Q on each carbon atom being hydrogen, X represents a member selected from the group consisting of oxygen and sulfur and Z represents a member selected from the group consisting of hydrogen, alkyl groups, alkoxyl groups and halogen.

2. The compounds which are represented by the following formula:

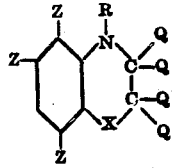

wherein R represents a hydroxyalkyl group, Q represents a member selected from the group consisting of hydrogen and alkyl groups at least one Q on each carbon atom being hydrogen, X represents a member selected from the group consisting of oxygen and sulfur and Z represents a member selected from the group consisting of hydrogen, alkyl groups, alkoxyl groups and halogen.

3. The compounds which are represented by the following general formula:

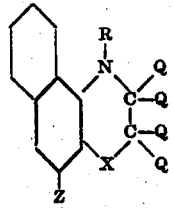

wherein R represents a hydroxyalkyl group, Q represents a member selected from the group consisting of hydrogen and alkyl groups at least one Q on each carbon atom being hydrogen, X represents a member selected from the group consisting of oxygen and sulfur and Z represents a member selected from the group consisting of hydrogen, alkyl groups, alkoxyl groups and halogen.

4. The compounds which are represented by the following general formula:

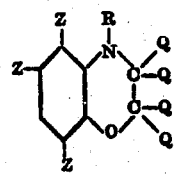

wherein R represents a hydroxyalkyl group, Q represents a member selected from the group consisting of hydrogen and alkyl groups, at least one Q on each carbon atom being hydrogen and Z represents a member selected from the group consisting of hydrogen, alkyl groups, alkoxyl groups and halogen.

5. Compounds having the general formula:

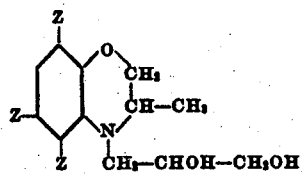

wherein at least one Z is alkyl and any remaining Z is hydrogen.

6. The compound 2,7-dimethyl-N-2,3-dihydroxypropylbenzomorpholine.

7. The compound N-2,3-dihydroxypropyl-2-methylbenzomorpholine.

JOSEPH B. DICKEY.
JAMES G. McNALLY.